US012759240B2

(12) United States Patent
Lobovsky et al.

(10) Patent No.: US 12,759,240 B2
(45) Date of Patent: Oct. 13, 2026

(54) ADDITIVE FABRICATION TECHNIQUES WITH TEMPERATURE COMPENSATION

(71) Applicant: Formlabs Inc., Somerville, MA (US)

(72) Inventors: Maxim Lobovsky, Cambridge, MA (US); Andrew Goldman, Stow, MA (US)

(73) Assignee: Formlabs Inc., Somerville, MA (US)

( * ) Notice: Subject to any disclaimer, the term of this patent is extended or adjusted under 35 U.S.C. 154(b) by 465 days.

(21) Appl. No.: 18/322,059

(22) Filed: May 23, 2023

(65) Prior Publication Data

US 2023/0382053 A1 Nov. 30, 2023

Related U.S. Application Data

(60) Provisional application No. 63/365,207, filed on May 24, 2022.

(51) Int. Cl.

| | |
|---|---|
| ***B29C 64/393*** | (2017.01) |
| ***B29C 64/124*** | (2017.01) |
| ***B33Y 10/00*** | (2015.01) |
| ***B33Y 50/02*** | (2015.01) |

(52) U.S. Cl.

CPC .......... *B29C 64/393* (2017.08); *B29C 64/124* (2017.08); *B33Y 10/00* (2014.12); *B33Y 50/02* (2014.12)

(58) Field of Classification Search

CPC ... B29C 64/393; B29C 64/124; B29C 64/129; B29C 64/386; B33Y 10/00; B33Y 50/02; B33Y 30/00; B33Y 50/00

See application file for complete search history.

(56) References Cited

U.S. PATENT DOCUMENTS

| | | | | |
|---|---|---|---|---|
| 2018/0086003 | A1* | 3/2018 | Greene | B33Y 50/02 |
| 2019/0143607 | A1* | 5/2019 | Ogawa | G06F 30/00<br>374/55 |
| 2021/0031458 | A1* | 2/2021 | Ong | B29C 64/393 |
| 2022/0088878 | A1* | 3/2022 | Zeng | B33Y 50/02 |

FOREIGN PATENT DOCUMENTS

| | | | | |
|---|---|---|---|---|
| WO | WO-2020080175 A1 * | 4/2020 | | B33Y 50/00 |

* cited by examiner

*Primary Examiner* — Yuhui R Pan

(57) ABSTRACT

A method for producing a three-dimensional (3D) object on an additive fabrication device includes receiving, by a computer, print instructions for the 3D object. The print instructions include a sequence of print maps, each print map corresponding to a sub-instruction for producing a respective cross-section of the 3D object. The method also includes exposing, by an energy source, resin stored in a resin container at a print plane according to a first print map of the sequence of print maps, and modifying a second print map of the sequence of print maps. The method further includes exposing, by the energy source, resin stored in the resin container at the print plane according to the modified second print map.

9 Claims, 9 Drawing Sheets

ADDITIVE FABRICATION TECHNIQUES WITH TEMPERATURE COMPENSATION

CROSS REFERENCE TO RELATED APPLICATIONS

This U.S. patent application claims priority under 35 U.S.C. § 119(e) to U.S. Provisional Application 63/365,207, filed on May 24, 2022. The disclosure of this prior application is considered part of the disclosure of this application and is hereby incorporated by reference in its entirety.

TECHNICAL FIELD

This disclosure relates to an improved process for controlling printing parameters for use in an additive fabrication system.

BACKGROUND

Additive fabrication, e.g., three-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography, solid objects are created by successively forming thin layers of a curable polymer resin, typically first onto a build surface and then one on top of another. Exposure to actinic radiation cures a thin layer of liquid resin, which causes it to harden and adhere to the bottom surface of the build surface or a previously cured layer on the bottom surface of the build surface.

Stereolithography printers generally contain a vat of photocurable resin that can be cured when the resin interacts with light, usually in the near UV wavelength (e.g., 365-405 nm), predominantly at 405 nm. Historically, lasers were used for light delivery, but in recent years, area projection technologies such as DLP and LCD have been used for light delivery. LCD optical systems consist of a UV backlight which transmits light through an LCD screen from the display industry that is used as a spatial mask layer by layer to trace out the geometry of each layer of the model to be printed.

SUMMARY

One aspect of the disclosure provides a computer-implemented method that, when executed by data processing hardware, causes the data processing hardware to perform operations that include receiving print instructions for a three-dimensional (3D) object. The print instructions include a sequence of print maps, each print map corresponding to a sub-instruction for producing a respective cross-section of the 3D object. The operations also include exposing, by an energy source, resin stored in a resin container at a print plane according to a first print map of the sequence of print maps, and modifying a second print map of the sequence of print maps. The operations further include exposing, by the energy source, resin stored in the resin container at the print plane according to the modified second print map.

Implementations of the disclosure may include one or more of the following optional features. In some implementations, modifying the second print map includes receiving, as inputs to a thermal history model, all print maps prior to the second print map. Here, the operations further include simulating, using the thermal history model, a resin temperature at the print plane, and modifying one or more print parameters associated with the second print map based on the simulated resin temperature at the print plane. In these implementations, receiving, as inputs to the thermal history model, all print maps prior to the second print map may include receiving, as input, exothermic effects from curing of the resin, where simulating, using the thermal history model, the resin temperature is based on the exothermic effects from the curing of resin according to all print maps prior to the second print map. Additionally or alternatively, the energy source includes a thermal imaging device. Here, modifying the second print map may further include measuring a resin temperature using an array of temperature measuring devices of the thermal imaging device, where simulating the resin temperature is based on the measured resin temperature. Measuring the resin temperatures may include measuring the resin temperature at the print plane.

In some examples, modifying the one or more print parameters associated with the second print map based on the simulated resin temperature includes modifying one or more of an outer boundary, an exposure time, or an exposure intensity associated with the second print map. Here, the outer boundary may include one of an expanded perimeter or a contracted perimeter. In some implementations, the operations further include determining that the modified one or more print parameters associated with the second print map exceed a predetermined threshold value, and adapting the thermal history model based on the modified one or more print parameters associated with the second print map. In some examples, the energy source includes a liquid crystal panel.

Another aspect of the disclosure provides a system including data processing hardware and memory hardware in communication with the data processing hardware. The memory hardware stores instructions that when executed on the data processing hardware causes the data processing hardware to perform operations that include receiving, by a computer, print instructions for a three-dimensional (3D) object. The print instructions include a sequence of print maps, each print map corresponding to a sub-instruction for producing a respective cross-section of the 3D object. The operations also include exposing, by an energy source, resin stored in a resin container at a print plane according to a first print map of the sequence of print maps, and modifying a second print map of the sequence of print maps. The operations further include exposing, by the energy source, resin stored in the resin container at the print plane according to the modified second print map.

This aspect may include one or more of the following optional features. In some implementations, modifying the second print map includes receiving, as inputs to a thermal history model, all print maps prior to the second print map. Here, the operations further include simulating, using the thermal history model, a resin temperature at the print plane, and modifying one or more print parameters associated with the second print map based on the simulated resin temperature at the print plane. In these implementations, receiving, as inputs to the thermal history model, all print maps prior to the second print map may include receiving, as input, exothermic effects from curing of the resin, where simulating, using the thermal history model, the resin temperature is based on the exothermic effects from the curing of resin according to all print maps prior to the second print map. Additionally or alternatively, the energy source includes a thermal imaging device. Here, modifying the second print map may further include measuring a resin temperature using an array of temperature measuring devices of the thermal imaging device, where simulating the resin temperature is based on the measured resin temperature. Measuring the resin temperatures may include measuring the resin temperature at the print plane.

In some examples, modifying the one or more print parameters associated with the second print map based on the simulated resin temperature includes modifying one or more of an outer boundary, an exposure time, or an exposure intensity associated with the second print map. Here, the outer boundary may include one of an expanded perimeter or a contracted perimeter. In some implementations, the operations further include determining that the modified one or more print parameters associated with the second print map exceed a predetermined threshold value, and adapting the thermal history model based on the modified one or more print parameters associated with the second print map. In some examples, the energy source includes a liquid crystal panel.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure relates to a curing system for an additive fabrication device (i.e., a three-dimensional (3D) printer) that incorporates a liquid crystal panel configured to emit unfiltered monochromatic light to transform a liquid photopolymer resin into a solid layer of a fabricated component. Unlike conventional additive fabrication systems, which may include curing systems having lasers or digital light processing (DLP) projectors, the curing system of the present disclosure includes the liquid crystal panel disposed adjacent to a basin that holds the liquid photopolymer resin to be cured. The liquid crystal panel is configured to emit unfiltered monochromatic light to the photopolymer resin within the basin at an optimal wavelength for curing the photopolymer resin. Using a liquid crystal panel according to the present disclosure offers the advantages over conventional laser and DLP curing systems, such as providing a high-resolution (e.g., up to 7,680×4,320 pixels) dimensional grid with a minimized optical path between the liquid crystal panel and the fabricated layer of the component. Reducing the optical path minimizes potential thermal drift between the curing system and the resin within the basin, ensuring more precise definition of the fabricated part.

Figure 1A:
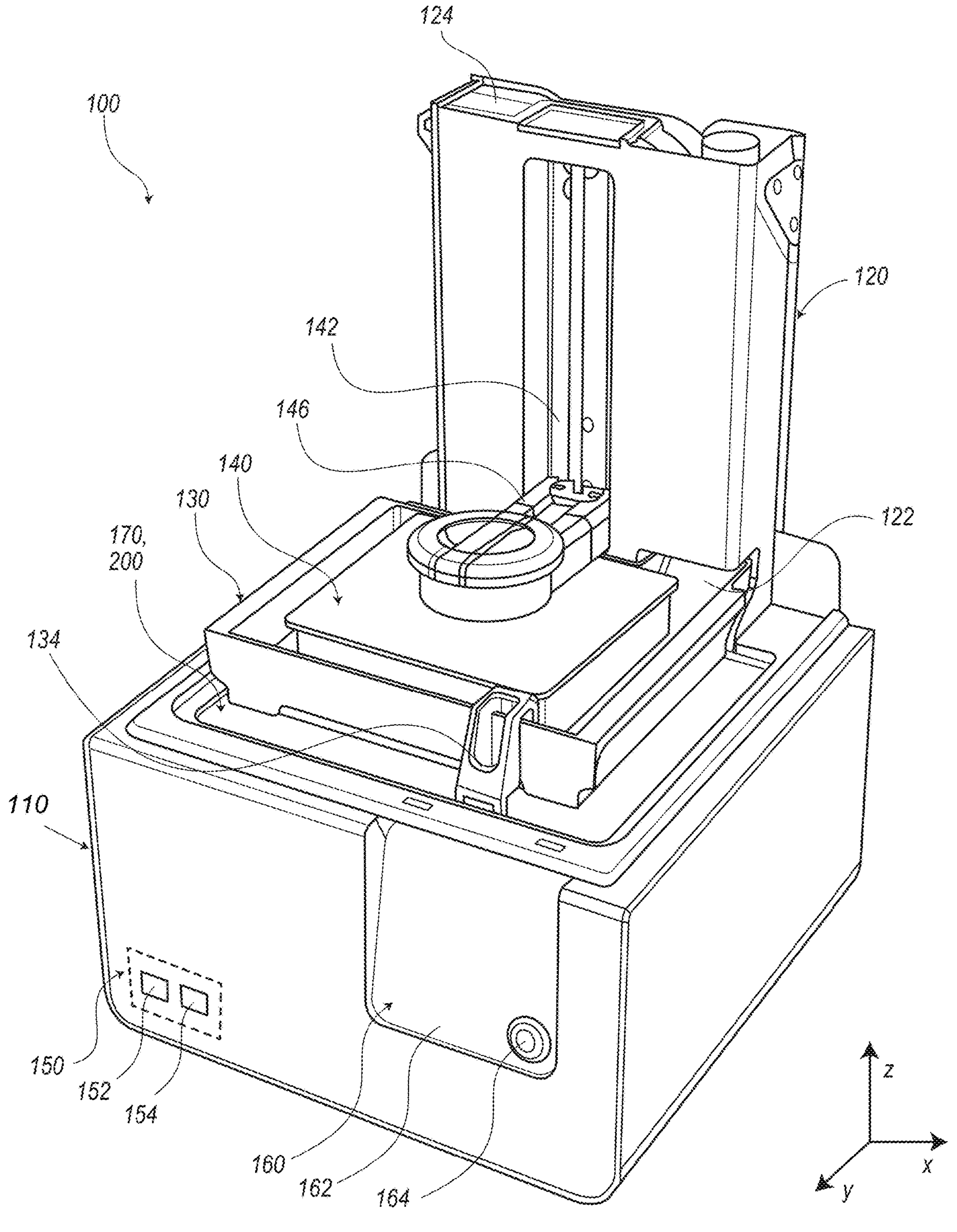
FIG. 1A shows a perspective view of an example additive fabrication system, where the system is arranged in an initial configuration.
Figure 1B:
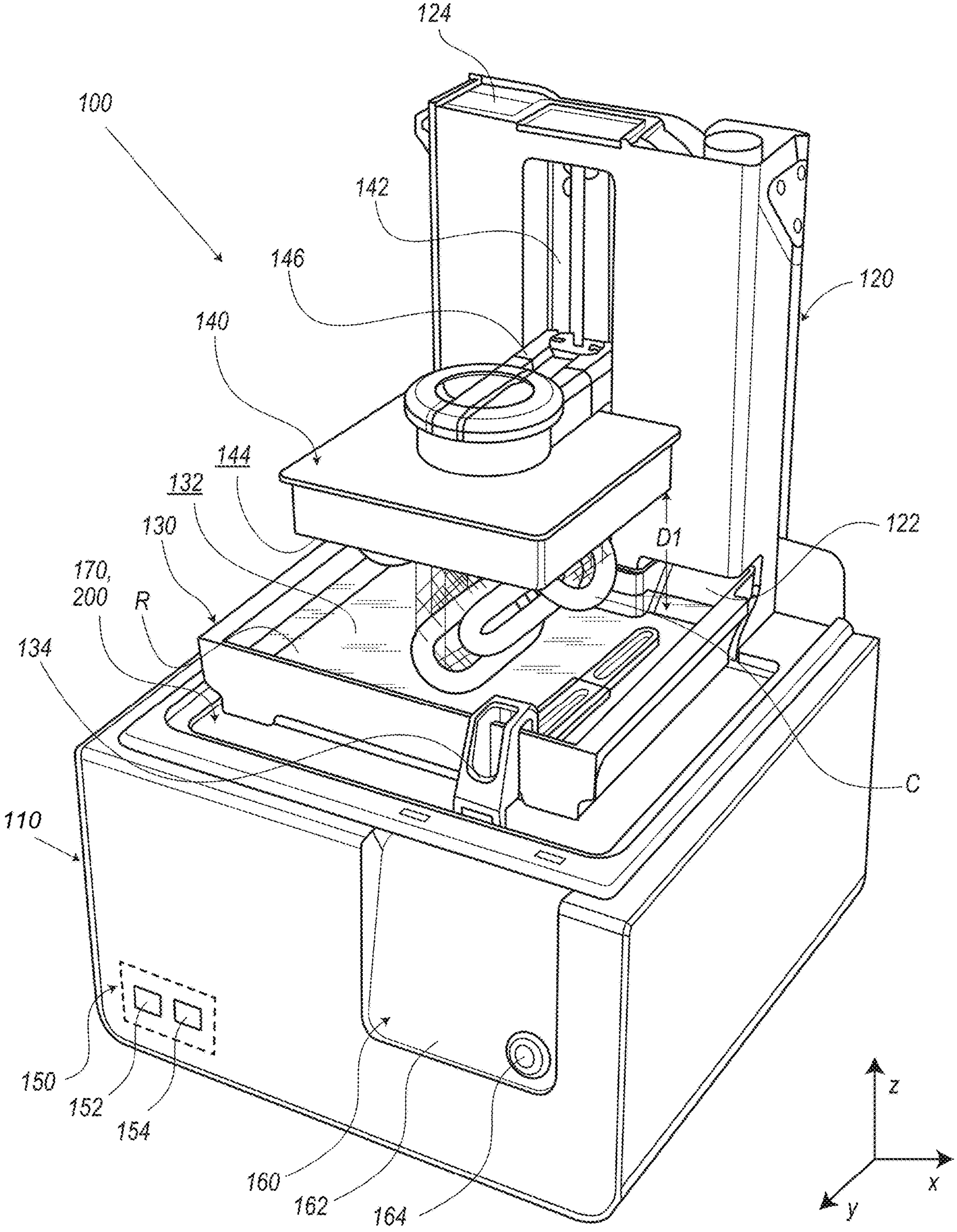
FIG. 1B shows a perspective view of the additive fabrication system of FIG. 1A, where the system is arranged in a fabricating configuration.
Figure 1C:
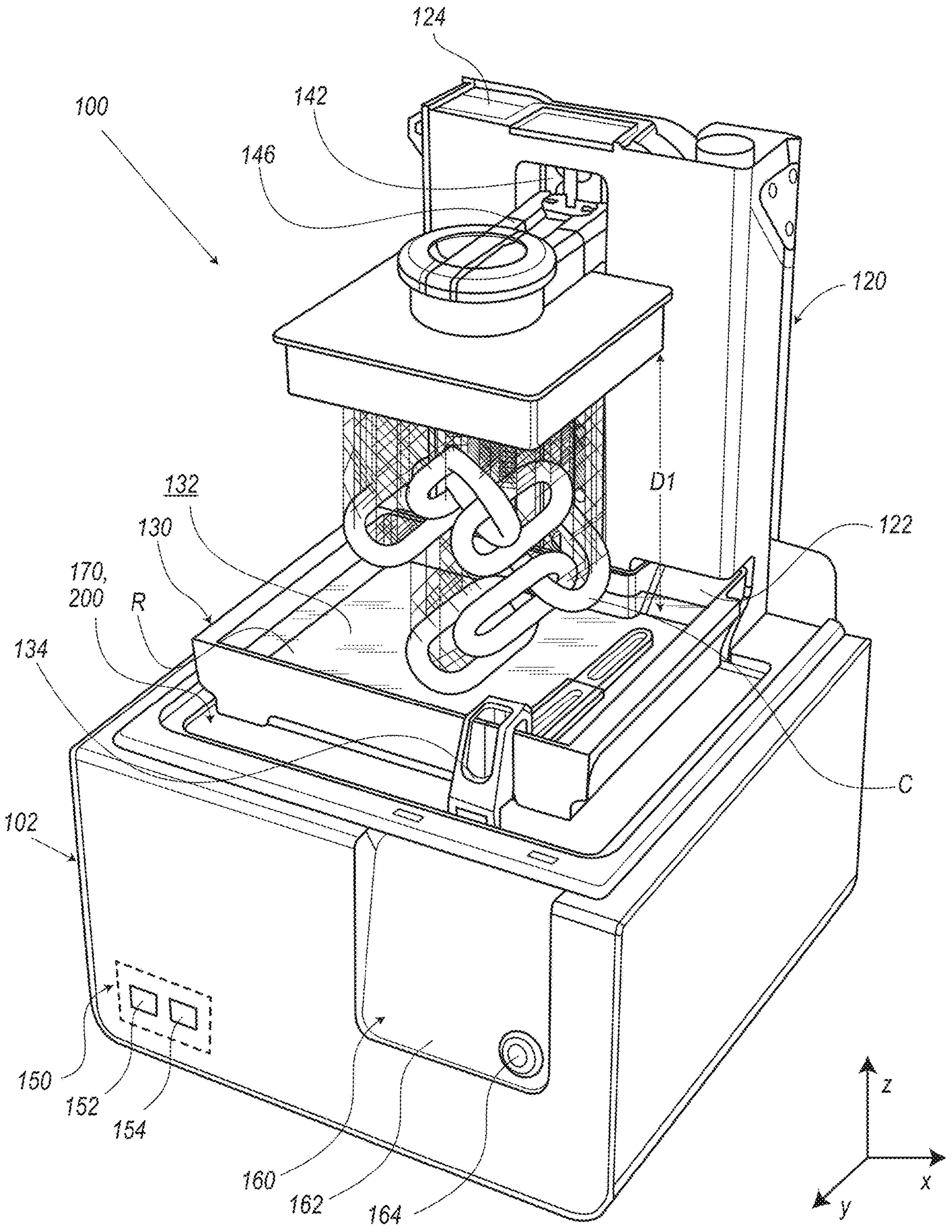
FIG. 1C shows a perspective view of the additive fabrication system of FIG. 1A, where the system is arranged in a finished configuration.

Referring to FIGS. 1A-1C, an additive fabrication device 100, such as a stereolithographic printer, includes a base 110 and a dispensing system 120 coupled to the base 110. The base 110 supports a fluid basin 130 configured to receive a photopolymer resin from the dispensing system 120. The printer 100 further includes a build platform 140 positioned above the fluid basin 130 and operable to traverse a vertical axis (e.g., z-axis) between an initial position (FIG. 1A) adjacent to a bottom surface 132 of the fluid basin 130 and a finished position (FIG. 1C) spaced apart from the bottom surface 132 of the fluid basin 130.

The base 110 of the printer 100 may house various mechanical, optical, and electronic components operable to fabricate objects using the printer 100. In the illustrated example, the base 110 includes a computing system 150 including data processing hardware 152 and memory hardware 154. The data processing hardware 152 is configured to execute instructions stored in the memory hardware 154 to perform computing tasks related to activities (e.g., movement and/or printing based activities) for the printer 100. Generally speaking, the computing system 150 refers to one or more locations of data processing hardware 152 and/or memory hardware 154. For example, the computing system 150 may be located locally on the printer 100 or as part of a remote system (e.g., a remote computer/server or a cloud-based environment).

The base 110 may further include a control panel 160 connected to the computing system 150. The control panel 160 includes a display 162 configured to display operational information associated with the printer 100 and may further include an input device 164, such as a keypad or selection button, for receiving commands from a user. In some examples, the display 162 is a touch-sensitive display providing a graphical user interface configured to receive the user commands from the user in addition to, or in lieu of, the input device 164.

The base 110 houses a curing system 170 configured to transmit actinic radiation into the fluid basin 130 to incrementally cure layers of the photopolymer resin contained within the fluid basin 130. The curing system 170 may include a projector or other radiation source configure to emit light at a wavelength suitable to cure the photopolymer resin within the basin 130. Thus, different light sources may be selected depending on the desired photopolymer resin to be used for fabricating a component C. In the present disclosure, the curing system 170 includes a liquid crystal panel 200 for curing the photopolymer resin within the fluid basin 130.

As shown, the fluid basin 130 is disposed atop the base 110 adjacent to the curing system 170 and is configured to receive a supply of the resin R from the dispensing system 120. The dispensing system 120 may include an internal reservoir 124 providing an enclosed space for storing the resin R until the resin R is needed in the fluid basin 130. The dispensing system 120 further includes a dispensing nozzle 122 in communication with the fluid basin 130 to selectively supply the resin R from the internal reservoir 124 to the fluid basin 130.

The build platform 140 may be movable along a vertical track or rail 142 (oriented along the z-axis direction, as shown in FIGS. 1A-1C) such that a base-facing build surface 144 (FIG. 1B) of the build platform 140 is positionable at a target distance D1 along the z-axis from the bottom surface 132 of the fluid basin 130. The target distance D1 may be selected based on a desired thickness of a layer of solid material to be produced on the build surface 144 of the build platform 140 or onto a previously formed layer of the object being fabricated. In some implementations, the build platform 140 is removable from the printer 100. For instance, the build platform 140 may be attached to the rail 142 by an arm 146 (e.g., pressure fit or fastened onto) and may be selectively removed from the printer 100 so that a fabricated component C attached to the build surface 144 can be removed via the techniques described above.

In the example of FIGS. 1A-1C, the bottom surface 132 of basin 130 may be transparent to actinic radiation that is generated by the curing system 170 located within the base 110, such that liquid photopolymer resin located between the bottom surface 132 of the basin 130 and the build surface 144 of the build platform 140, or an object being fabricated thereon, may be exposed to the radiation. Upon exposure to such actinic radiation, the liquid photopolymer may undergo a chemical reaction, sometimes referred to as “curing,” that substantially solidifies and attaches the exposed resin R to the build surface 144 of the build platform 140 or to a bottom surface of an object being fabricated thereon.

Following the curing of a layer of the fabrication material, the build platform 140 may incrementally advance upward along the rail 142 in order to reposition the build platform 140 for the formation of a new layer and/or to impose separation forces upon any bond with the bottom surface 132 of basin 130. In addition, the basin 130 is mounted onto the support base 110 such that the printer 100 may move the basin 130 along a horizontal axis of motion (e.g., x-axis), the motion thereby advantageously introducing additional separation forces in at least some cases. A wiper 134 is additionally provided, capable of motion along the horizontal axis of motion and which may be removably or otherwise mounted onto the base 110 or the fluid basin 130.

With continued reference to FIGS. 1A-1C, the printer 100 is shown at different stages of the fabrication process. For example, at FIG. 1A, the printer 100 is shown in an initial state prior to dispensing the resin R into the basin 130 from the reservoir 124 of the dispensing system 120. Upon receipt of fabrication instructions, the printer 100 positions the build surface 144 of the build platform 140 at an initial distance D1 from the bottom surface 132 of the basin 130 corresponding to a thickness of the first layer of resin R to be cured. The curing system 170 then emits an actinic radiation profile (i.e., an image) corresponding to the profile of the current layer of the component C to cure the current layer. Upon curing of the current layer, the build platform 140 incrementally advances upward to the next build position. The distance of each advancement increment corresponds to a thickness of the next layer to be fabricated. The curing system 170 then projects the profile of the component layer corresponding to the new position. The new component layer is cured on a bottom surface of the previous component layer. The curing and advancing steps repeat until the build platform 140 reaches the final position (FIG. 1C) corresponding to the finished component C.

Figure 2A:
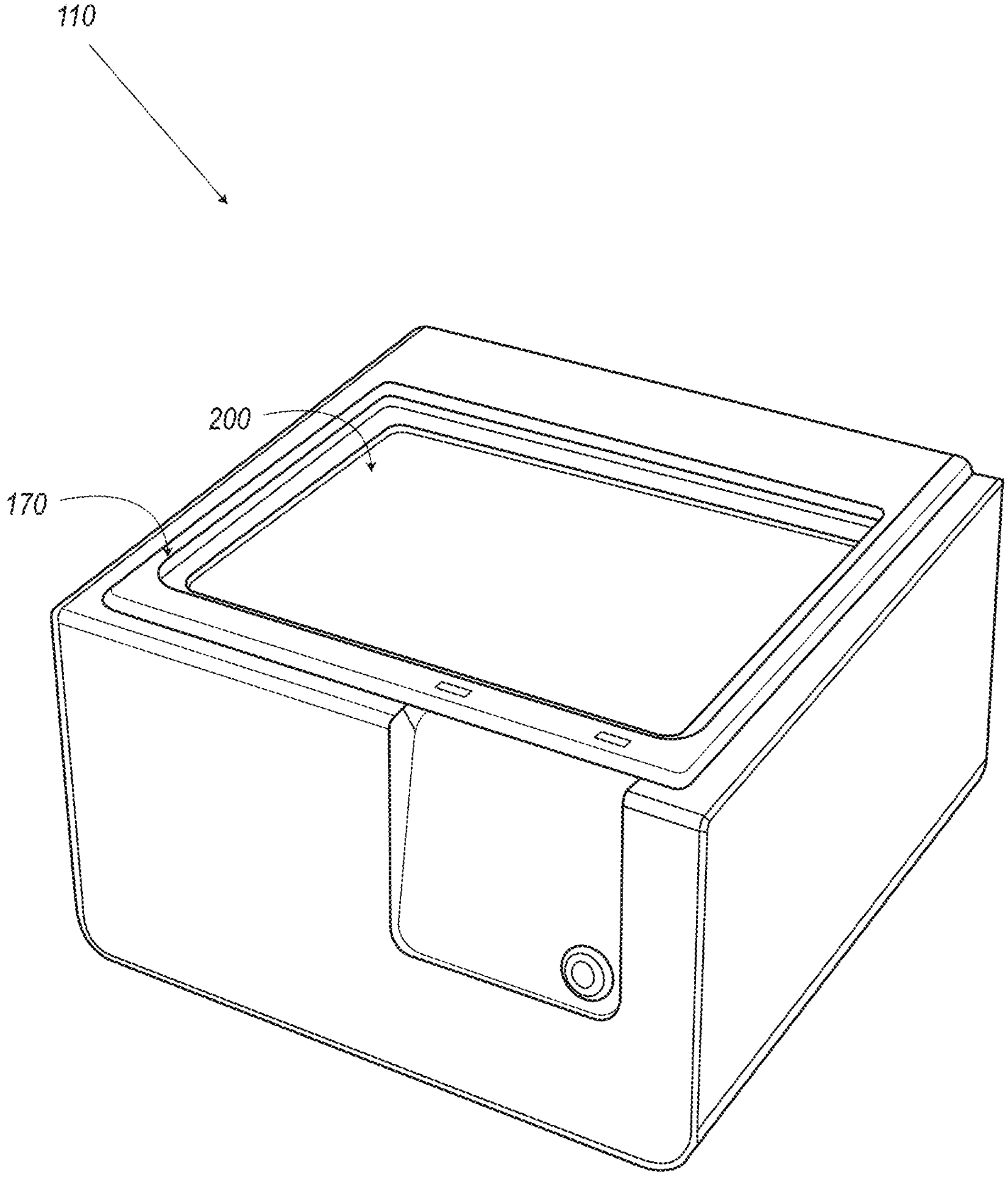
FIG. 2A shows a perspective view of an example base of the additive fabrication system of FIG. 1A.
Figure 2B:
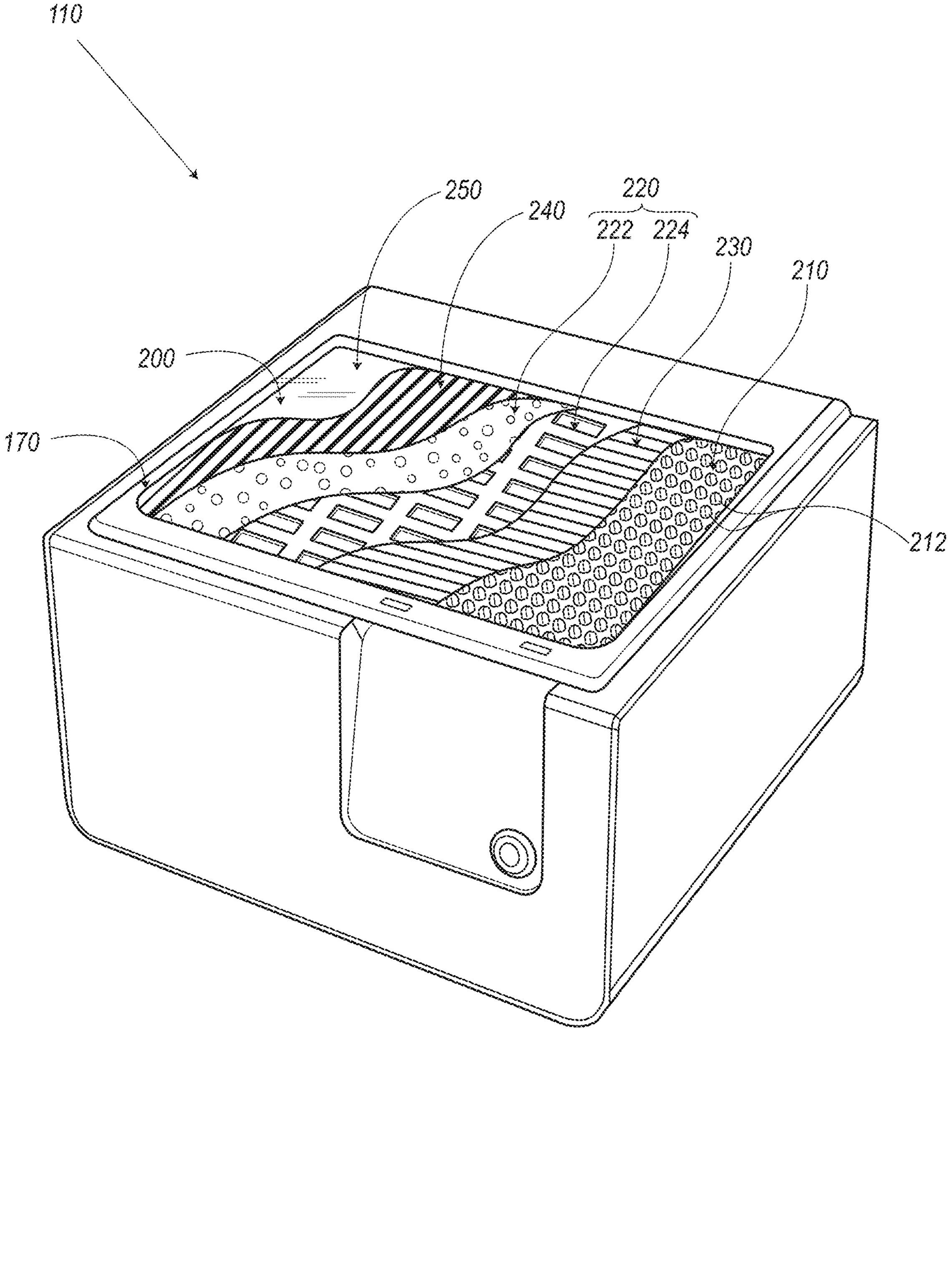
FIG. 2B shows a perspective view of the base of FIG. 2A, where components of a curing system of the base are partially sectioned to show a configuration of the curing system.
Figure 3:
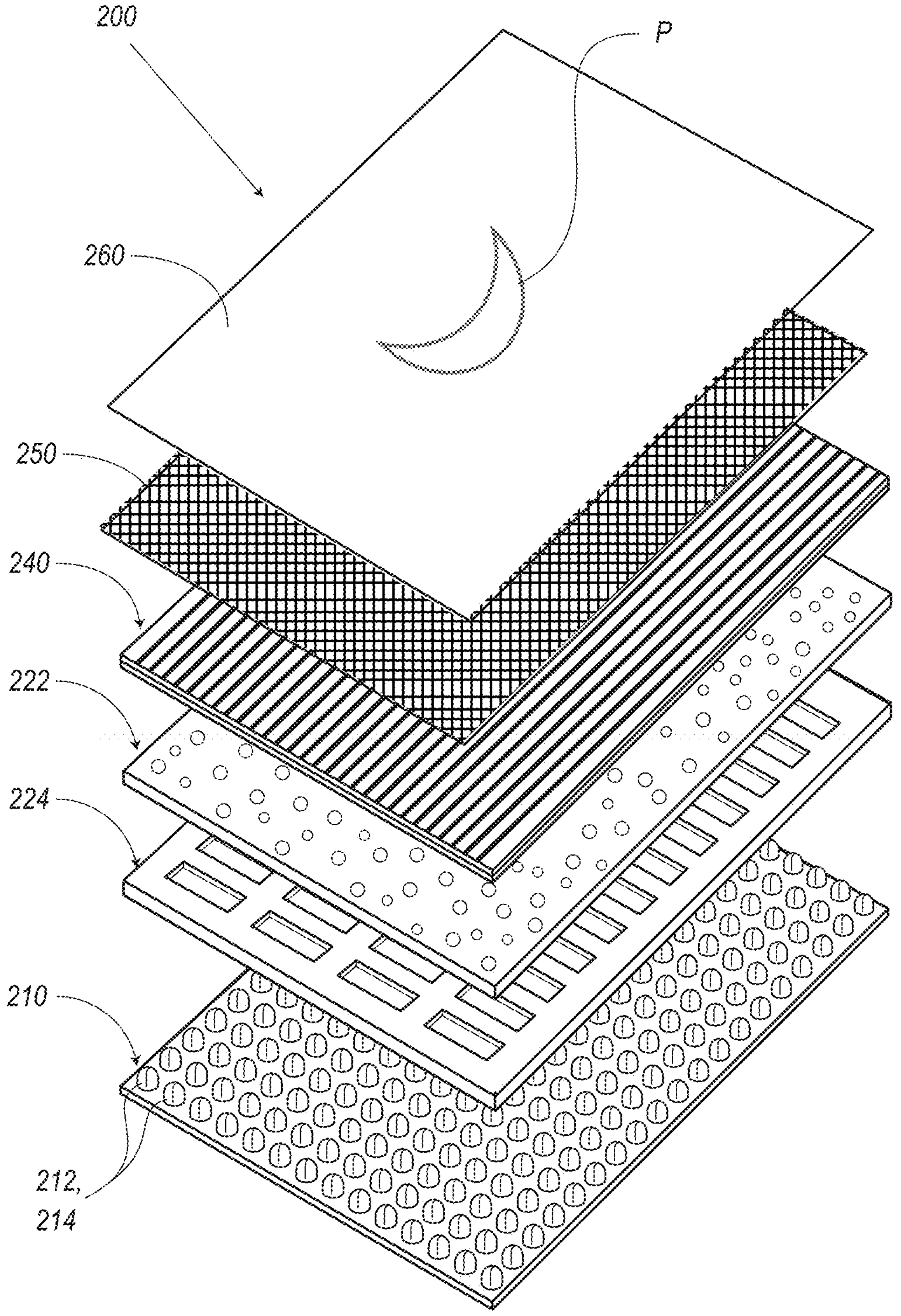
FIG. 3 is an exploded perspective view of an example liquid crystal panel.

Referring to FIGS. 2A and 2B, the base 110 of the printer 100 is illustrated without the dispensing system 120, the basin 130, and the build platform 140 to show the curing system 170. FIG. 2A provides a perspective view of the base 110 and curing system 170 in a completed state while FIG. 2B provides a perspective view of the base 110 showing the curing system 170 in partial section to expose the interior components of the liquid crystal panel 200 of the curing system 170. FIG. 3 further provides a schematic view of the liquid crystal panel 200. Note that, ratios among length, width, and thickness of each member in FIGS. 2A-3 may be different from those of an actual curing system 170 for clarity.

Generally, the curing system 170 is configured to provide actinic radiation through the bottom surface 132 of the basin 130 to cure a layer of the photopolymer resin R within the basin 130. The curing system 170 of the present disclosure includes the liquid crystal panel 200 disposed adjacent to the basin 130. Unlike conventional additive fabrication systems, which may include curing systems based on lasers or digital light processing (DLP) projectors, use of the liquid crystal panel 200 offers the advantage of providing a high-resolution (e.g., up to 7,680×4,320 pixels) dimensional grid with a minimized optical path between the panel 200 and the bottom surface 132 of the basin 130. Reducing the optical path minimizes potential thermal drift between the curing system 170 and the resin R within the basin, ensuring more precise definition of the fabricated part.

While off-the-shelf liquid crystal panels are available, these panels are typically optimized to output visible light for displaying an image for observation by the human eye. Thus, known liquid crystal panels (e.g., televisions or display monitors) generally emit various color components (e.g., blue, green, red) within the visible part of the electromagnetic spectrum (e.g., 400 nm to 750 nm). However, many photopolymer resins used with the additive fabrication devices 100 are optimized to cure using a wavelength of between 365 nm and 405 nm (inclusive). Because conventional liquid crystal panels are optimized to emit visible light, only approximately 1% of the light emitted from a conventional liquid crystal panel is output at the 365-405 nm wavelength. Accordingly, while functional, conventional liquid crystal panels are inefficient for use in a curing system 170, as curing rates would be significantly slower than known systems (e.g., lasers, DLP) using comparable amounts of power (e.g., Watts).

The liquid crystal panel 200 of the present disclosure is optimized to provide a greater optical transmission efficiency (e.g., greater than 15%) compared to optical transmission rates of conventional liquid crystal panels (e.g., approximately 1%), particularly with respect to wavelengths typically used for curing photopolymer resins (e.g., approximately 405 nm). With reference to FIGS. 2B and 3, the liquid crystal panel 200 includes a light unit 210, a liquid crystal cell 220, a first polarizer 230 disposed between the liquid crystal cell 220 and the light unit 210, and a second polarizer 240 disposed on an opposite side of the liquid crystal cell 220 than the first polarizer 230. The liquid crystal panel 200 may further include one or more glass layers 260 to provide support and protection for the liquid crystal panel 200. Unlike conventional liquid crystal panels, which may further include a color filter disposed between the liquid crystal cell 220 and the second polarizer 240, the liquid crystal panel 200 of the present disclosure does not include any color filter between the liquid crystal cell 220 and the second polarizer 240. Thus, the second polarizer 240 is disposed immediately adjacent to the liquid crystal cell 220 and receives unfiltered light directly from the liquid crystal cell 220.

The light unit 210 of the liquid crystal panel 200 includes a monochromatic light source 212 configured to emit an unpolarized light. In some examples, the light source 212 is configured as a backlight provided adjacent to the first polarizer 230. Furthermore, the light source 212 may be selected to emit light in a wavelength corresponding to the wavelength for curing the photopolymer resin R. For example, where the resin R is curable at a wavelength of 405 nm, the light source 212 may be selected or tuned to emit a 405 nm wavelength light. Accordingly, the light source 212 emits an unpolarized, monochromatic light having a wavelength suitable for curing the resin R. In the illustrated example, the light source 212 includes a panel having an array of light-emitting diodes (LEDs) 214. However, other light sources may be implemented as alternative or in addition to the panel array of LEDs 214, including edge-lit LEDs and/or cold cathode fluorescent lamps. As discussed below, known light sources suitable for use in the light unit 210 generally have an optical transmission efficiency of approximately 50%, which must be accounted for when determining the overall optical efficiency of the curing system.

Referring to FIG. 3, the liquid crystal cell 220 includes a liquid crystal layer 222 and a substrate 224 disposed between the first polarizer 230 and a first side of the liquid crystal layer 222. The liquid crystal layer 222 may include liquid crystal molecules arranged in a twist alignment in the absence of an electric field. The twist alignment generally refers to an alignment in which liquid crystal molecules in a liquid crystal layer are arranged substantially in parallel to the surface of the substrate 224, and the arrangement direction thereof is twisted at a predetermined angle (e.g., 90° or 270°) on the substrate surface so that light reaching the second polarizer 240, which is also oriented at the predetermined angle, can pass through the second polarizer 240 in the absence of the electric field at the liquid crystal layer 222. Typical examples of the liquid crystal cell 220 having a liquid crystal layer 222 in such an alignment state include a liquid crystal cell 220 of a twisted nematic (TN) mode, a supertwisted nematic (STN) mode, or an enhanced black nematic (EBN) mode.

The substrate 224 may include a plurality of switching elements 226 (e.g., thin-film transistors) each respectively associated with a pixel of the liquid crystal panel 200. The switching elements 226 are selectively turned on and off to control whether a specific pixel of the liquid crystal panel 200 will be illuminated by twisting the corresponding liquid crystal of the liquid crystal layer 222. Thus, in use, each of the switching elements 226 receives instructions from the computing system 150 corresponding to a profile P (FIG. 3) of a current build layer of the component C. The switching elements 226 of the substrate 224 are then switched on and off to illuminate pixels of the liquid crystal panel 200 corresponding to the profile P of the build layer. Specifically, when a switching element 226 is switched off, the light passing through liquid crystal corresponding to the switching element 226 is rotated such that it passes through the second polarizer 240 to illuminate the corresponding pixel. Conversely, when the switching element is turn on, the liquid crystals are twisted such that light passing through the liquid crystal is not rotated and does not pass through the second polarizer 240. The substrate 224 may include an alignment film on the side facing the first side of the liquid crystal layer 222. In some examples, the alignment film includes a surface subjected to an alignment treatment. Any suitable alignment technique may be adopted as long as liquid crystal molecules are arranged in a constant alignment state on the surface of the substrate 224.

Each of the polarizers 230, 240 is configured to filter light having undefined or mixed polarization into light having a defined polarization. The first polarizer 230 and the second polarizer 240 may be oriented at a 90° angle relative to each other, such that the first polarizer 230 filters the unpolarized light received from the light source 212 and the second polarizer 240 further filters the rotated light received from the liquid crystal cell 220. Specifically, the first polarizer 230 is configured to convert light received from the light source 212 into a first polarized light by filtering the light into a P-polarized light and an S-Polarized light. The P-polarized light then passes through the liquid crystal cell 220 and is rotated the predetermined angle (e.g., 90° or 270°) by the switching elements 226. The second polarizer 240 is configured to allow the rotated light received from the liquid crystal cell 220 to pass through while filtering out light that is not rotated by the predetermined angle. Thus, rotated light associated with each pixel defining the profile P of the build layer passes through the second polarizer 240 such that second polarizer 240 emits the profile P of the current build layer.

Conventional liquid crystal panels may implement a single layer or a multi-layered polarizing film, or a laminate (so-called polarizing plate) including a substrate and a polarizing film, or in which a polarizing film is sandwiched between at least two substrates via any adhesion layer. When incident light is split into two perpendicular polarization components (i.e., S-polarized light and P-polarized light), polarizer films used in conventional liquid crystal panels have a function of transmitting one of the polarization components and absorbing the other one of the perpendicular polarization component. In the display industry, the polarizers are typically made from an extruded Polyvinyl Alcohol (PVA) film impregnated with iodine. When PVA is stretched, the molecules are aligned such that a preferred polarization state of the light is transmitted. The iodine is used to absorb the light of the polarization state that is perpendicular to the aligned PVA structure. These polarizing films are then laminated directly to the transistor/LC layers. The PVA/Iodine polarizing films are extremely common and cost effective, with large volumes driven by the LCD display industry. However, data shows that absorptive polarizers that implement conventional polarizing films generally transmit only about 50% of incident energy.

In the present disclosure, the polarizers 230, 240 are optimized to maximize transmissivity of the 405 nm wavelength (or near-UV at 365-405 nm) through each polarizer 230, 240. The first polarizer 230 and the second polarizer 240 may be the same or different. For example, each of the above polarizers 230, 240 may include a wire grid polarizer optimized for transmission of the 405 nm wavelength (or near-UV at 365-405 nm). Unlike conventional film-based polarizers (e.g., extruded PVA film impregnated with iodine), which may only transmit 50% of incident light (including light at the 405 nm wavelength), a wire grid polarizer may transmit approximately 80% of incident light at the 405 nm wavelength. Thus, implementing each of the first polarizer 230 and the second polarizer 240 as wire grid polarizer (80% optical efficiency) provides a 60% increase in optical transmission at each polarizer 230, 240 compared to film-based polarizers (50% optical efficiency).

Optionally or alternatively, the first polarizer 230, the second polarizer 240, or both, may include a thin-film dielectric polarizer optimized for transmission of the 405 nm wavelength. Thin-film dielectric polarizers may have an optical transmission rate of up to approximately 98% for light having a wavelength of 405 nm. However, thin-film dielectric polarizers operate at a relatively large incident angle (e.g., 45° or larger), which limits the practical use of thin-film dielectric polarizers to incorporation as the first polarizer 230 disposed adjacent to the light source 212. Nevertheless, incorporating a thin-film dielectric polarizer (98% optical efficiency) as the first polarizer 230 provides a 96% increase in optical transmission at the first polarizer 230 compared to a film-based polarizer (50% optical efficiency). When implemented in combination with a wire grid polarizer (80% transmission rate) as the second polarizer 240, the overall optical transmission efficiency of the liquid crystal panel can be increased by up to approximately 314% over liquid crystal panels incorporating film-based absorptive polarizers.

The liquid crystal cell 220 includes an additional functional layer 250. In some examples, the functional layer 250 includes thin-film transistors (TFTs) (e.g., poly-Si TFT) configured for temperature sensing. An advantage of including an integrated temperature sensing layer, as opposed to relying on a separate temperature sensor, is that the production cost can be lowered as the temperature sensing layer can be fabricated when other TFT layers of the LCD are being fabricated. In some examples, the functional layer 250 configured as a temperature sensing layer includes a matrix of sensors of area sensing. Such an area sensor can detect an area profile of temperature and its change in real time. In another implementation, the functional layer 250 includes TFTs configured for additional sensing functions such as stress sensing.

Figure 4:
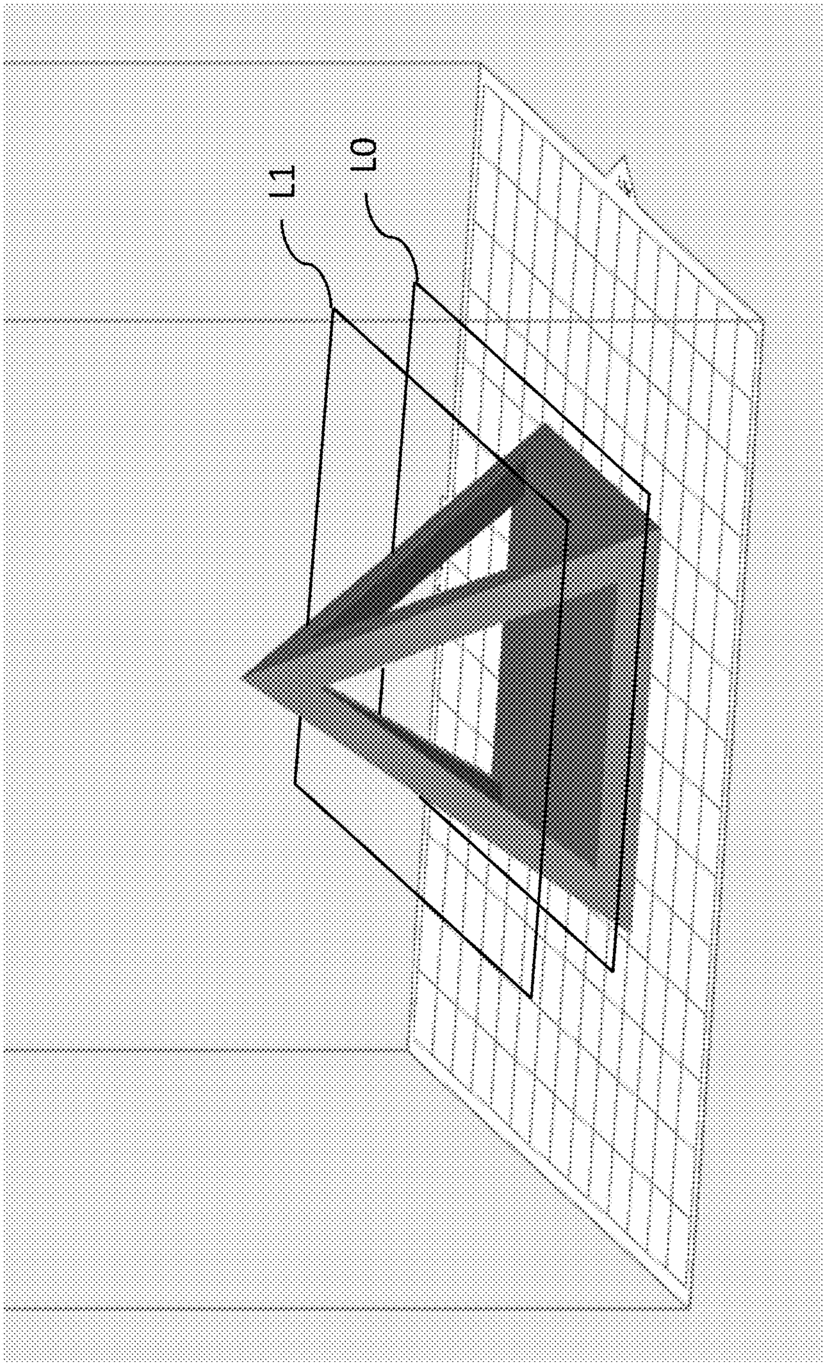
FIG. 4 is an example model of a part to be produced using an additive fabrication technique.
Figure 5:
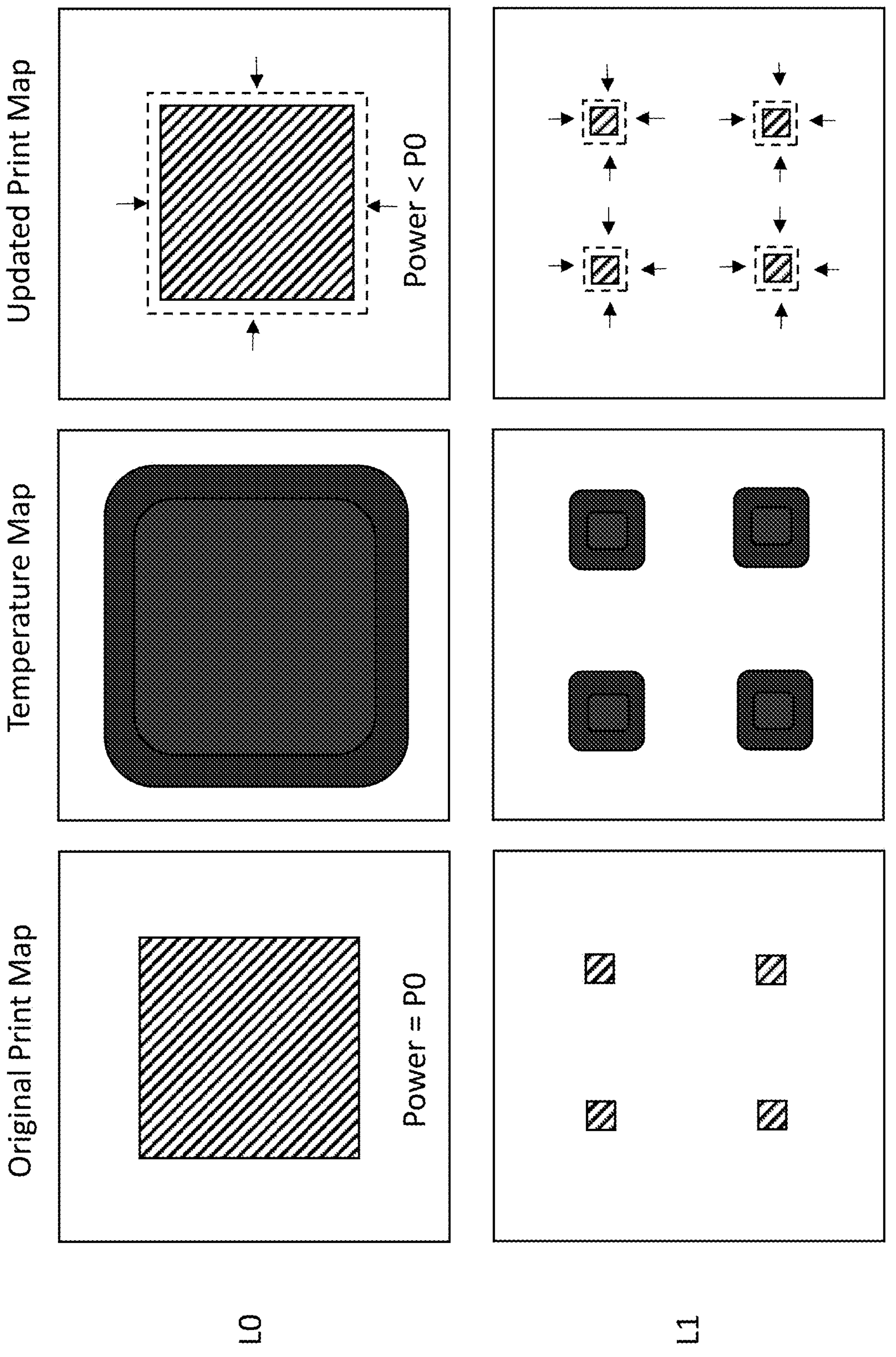
FIG. 5 shows print maps, temperature maps, and updated print maps of cross-sections of a part to be produced using an additive fabrication technique.
Figure 6:
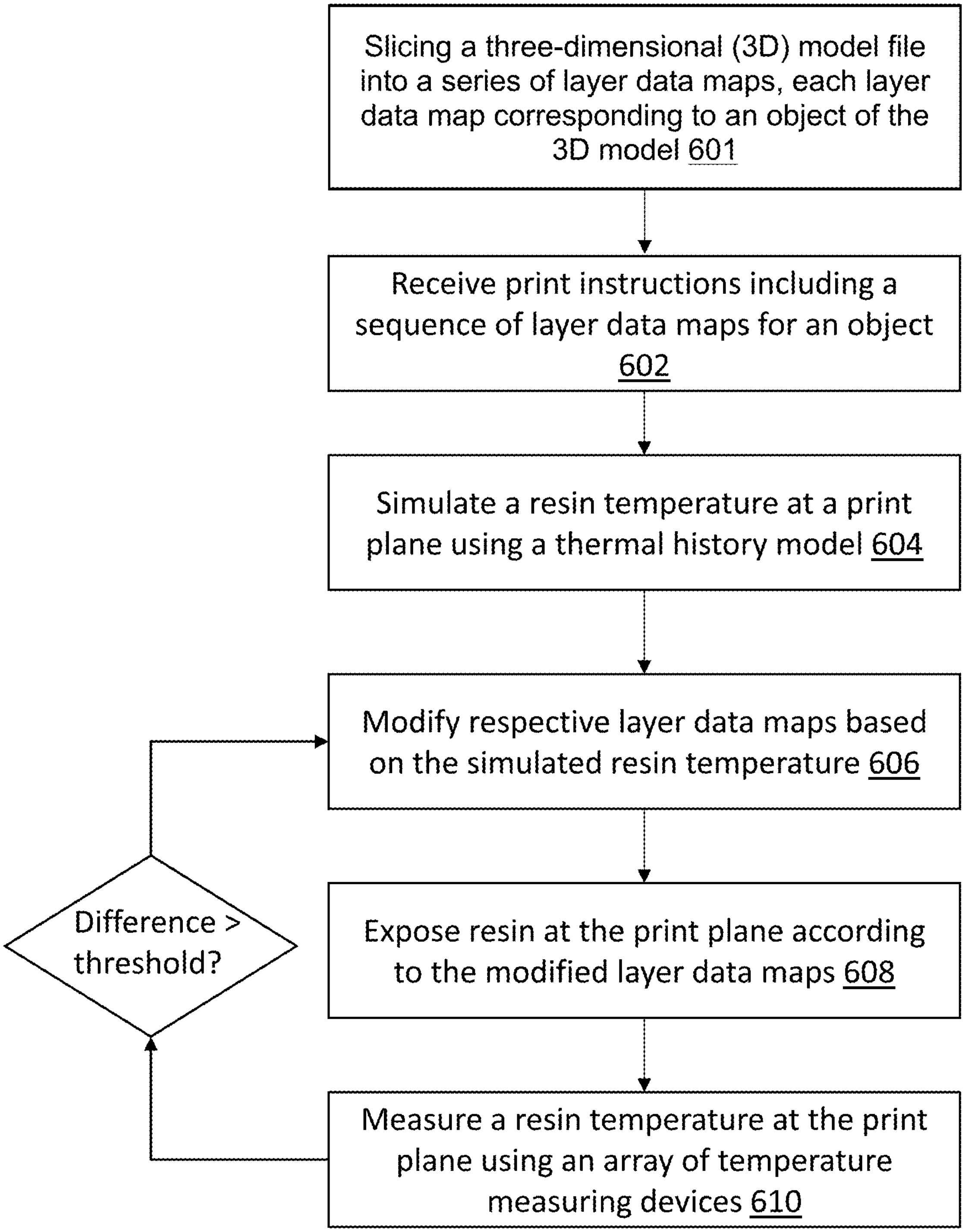
FIG. 6 is a flowchart of an example arrangement of operations for a method of producing an objecting using an additive fabrication technique with temperature compensation.

FIG. 4 illustrates an example for a part that can be manufactured using an additive fabrication technique. Two cross-sections of the part, indicated by L0 and L1, are shown in FIG. 4 and form a portion of a hollow pyramid. For example, cross-section L0 shows a base cross-section of the hollow pyramid, whereas the cross-section L1 shows a middle cross-section of the pyramid including four slanted columns. During an additive fabrication process, the hollow pyramid is being built layer-by-layer by curing a thin layer of light-polymerizable resin with an energy source (e.g., laser or LCD). Since the process of curing light-polymerizable resin is an exothermic process for many types of resins, heat is released during the curing process and can cause temperature to fluctuate at the curing plane. For example, the exothermic effect can create localized hot spots on a cross-section of the object and distorts its dimensions. Although such distortions are usually within a few millimeters, for small objects or objects with delicate features, such distortions can ruin the part production. In another example, the exothermic effect can cause the part to be produced at sub-optimal temperature condition and is subject to stress or other mechanical defects. FIGS. 5 and 6 illustrate a process to compensate for the exothermic effect by changing printing parameters such as reducing energy source intensity or print map outer boundary based on simulated or measured temperatures on the print plane.

FIG. 5 illustrates, on the left side of the figure, print maps of the hollow pyramid shown in FIG. 4 at cross-sections indicated by L0 and L1. A print map includes geometric information of the cross-section of the object to be built, as well as print parameter information such as energy intensity, laser path (for laser-based machines), pixel mask (for LCD or DMD based machines). A print map is generated by a pre-processing software, also known as a "slicer", by taking as input the object (e.g., in the .stl format) and producing a machine readable code.

The middle column in FIG. 5 shows respective temperature maps at L0 and L1. In some examples, the temperature maps can be generated in three ways: (1) by simulating the print process with the original print maps before the actual production of the object, preferably using an accumulative model (e.g., summing up the heat simulated from all the previous layers); (2) by measuring the temperature at the print surface using a temperature sensor matrix (e.g., the temperature sensor matrix integrated in the functional layer 250 in the LCD as introduced in FIG. 3) or another temperature sensing device such as a thermal imaging device during the print process; or (3) by combining (1) and (2). In the case of measuring temperature using a thermal imaging device, the thermal imaging device may be placed under the LCD panel (e.g., close to the energy source) to image through the LCD panel. For example, some LCD panels can appear transparent to IR or near-IR light.

For example, in FIG. 5, the temperature maps show that the peripheral regions have a lower temperature than the core regions. This is due to the fact the peripheral regions have better heat dissipation (e.g., to surrounding liquid, uncured resin). Further, the peripheral regions are not impacted by the accumulated heat as much as the center region due to the geometry of the pyramid in FIG. 4.

The right side of the figures show two updated print maps, based on the measured/simulated temperature maps. In the updated print maps, the outer boundary (e.g., the perimeter) may be expanded or contracted based on the measured/simulated temperature maps. As shown in FIG. 5, the outer boundary of the original print maps are offset inwards (e.g., contracted) to compensate for the temperature variation. Additionally or optionally, the energy source power is reduced. The amount of the outer boundary offset is based on the temperature of the print layer (e.g., a larger temperature rise will cause a larger outer boundary offset, and a larger temperature rise will case a larger reduction in energy source power).

In some examples, the updating of print maps is performed ad hoc during the printing process, based on real-time temperature sensing. Alternatively, the updating of print maps is performed before the print starts by simulating the temperature maps using an accumulative model with the original print maps. In another implementation, the updating of print maps is done both before the print starts using simulation methods, and during print with real-time temperature sensing.

FIG. 6 illustrates an example for a part that may be manufactured using an additive fabrication technique, using the temperature compensation techniques as described in FIGS. 4 and 5.

In a first operation, 601, the 3D model file (i.e., object geometry file) may be sliced into a series of layer data maps (e.g., corresponding to cross-section layers of the 3D model). Each layer data map may correspond to a part geometry of the 3D model such that each layer data map represents one 3D object layer.

In operation 602, the sliced object file may be received by the additive fabrication device. For a given print plane (i.e., the 3D object layer that is in fabrication) temperature data may be collected using a temperature measurement device (e.g., a thermal camera, sensors, etc.) that measures temperatures indirect to the print plane (e.g., resin tank temperature, object surface temperature, etc.) such that operation 604 determines a simulated temperature model at the given print plane using the temperature data.

In operation 606, based on the simulated temperature model of the given print plane, the processor may modify the respective layer data map of the given print plane. The linear difference between the outer boundaries of the original and modified layer data maps correspond to the outer boundary offset.

In operation 608, light polymerization (or another functionally equivalent form of energy polymerization) is performed on the given print plane where the dimensions of resin R cured through polymerization at the given print plane corresponds to the modified layer data map for the given print plane, taking in account the outer boundary offset.

An array of temperature measurement devices collects temperature data at the given print plane in operation 610. The measured temperatures from operation 610 is compared to the simulated temperature model used in operation 606.

Based on the difference between the actual and simulated temperatures and a predetermined threshold value, the processor adapts the process it uses to create the outer boundary offset to minimize the difference between actual and simulated temperatures. For example, the processor may update the thermal history model based on the modified one or more print parameters associated with modified layer of the data map. This process of operations may be repeated as needed to fabricate each 3D object layer.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that, when executed by data processing hardware, causes the data processing hardware to perform operations comprising:

receiving print instructions for a three-dimensional (3D) object, the print instructions including a sequence of print maps corresponding to a sub-instruction for producing a respective cross-section of the 3D object;

determining a resin temperature at a print plane associated with a first print map of the sequence of print maps;

generating an updated print map by expanding or contracting an outer perimeter of the first print map based on the resin temperature associated with the first print map;

exposing, by an energy source, resin stored at the print plane according to the updated first print map;

after exposing the resin, obtaining a second temperature of the exposed resin at the print plane;

comparing the second temperature of the exposed resin to a simulated temperature model associated with the print plane; and when the difference between the second temperature of the exposed resin and the simulated temperature model exceeds a predetermined threshold, modifying the updated print map to generate a second updated print map by modifying one or more of the outer perimeter, an exposure time, or an exposure intensity.

2. The method of claim 1, wherein determining the resin temperature at the print plane comprises:

receiving, as inputs to a thermal history model, temperature maps associated with a plurality of print maps prior to the first print map;

simulating, using the thermal history model, the resin temperature at the print plane associated with the first print map; and generating a temperature map associated with the first print map based on the simulated resin temperature.

3. The method of claim 2, wherein receiving, as inputs to the thermal history model, all print maps prior to the first print map comprises receiving, as input, exothermic effects from curing of the resin, and wherein simulating, using the thermal history model, the resin temperature is based on the exothermic effects from the curing of resin according to all print maps prior to the first print map.

4. The method of claim 1, wherein determining the resin temperature at the print plane comprises measuring the resin temperature at the print plane.

5. The method of claim 1, wherein the energy source includes a thermal imaging device.

6. The method of claim 5, wherein determining the resin temperature at the print plane comprises:

measuring the resin temperature using an array of temperature measuring devices of the thermal imaging device, and simulating the resin temperature at the print plane based on the measured resin temperature.

7. The method of claim 1, further comprising modifying one or more of an exposure time or an exposure intensity associated with the first print map based on the resin temperature.

8. The method of claim 1, wherein determining the resin temperature at the print plane associated with the first print map further includes:

collecting temperature data that is indirect to the print plane according to the first print map; and using the collected temperature data, determining a simulated temperature model including the resin temperature at the print plane.

9. The method of claim 1, where the energy source comprises a liquid crystal panel.

* * * * *